Oct. 9, 1934.  P. E. HOCHSTETTER  1,976,499
CONTROL SYSTEM
Filed Oct. 21, 1931
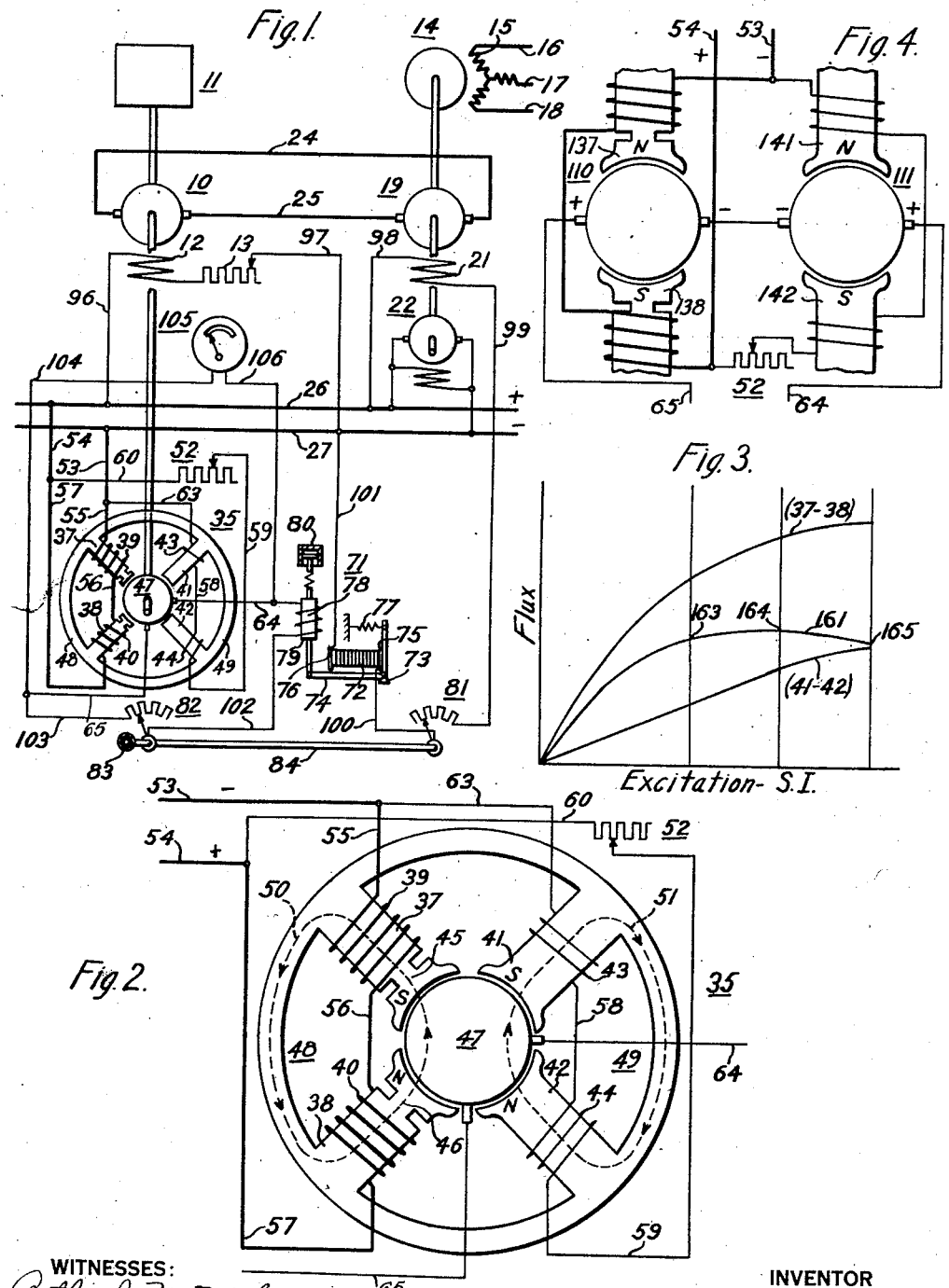
WITNESSES:
Arthur J. McMahon
George V. Woodling
INVENTOR
Paul E. Hochstetter.
BY
W. R. Coley
ATTORNEY Patented Oct. 9, 1934

1,976,499

UNITED STATES PATENT OFFICE 1,976,499

CONTROL SYSTEM

Paul E. Hochstetter, Edgewood, Pa., assignor to Westinghouse Electric & Manufacturing Company, a corporation of Pennsylvania Application October 21, 1931, Serial No. 570,100

19 Claims. (Cl. 172—239)

My invention relates generally to control systems and more particularly to control systems employing dynamo-electric machines which may be utilized for maintaining the speed of a driving motor substantially constant.

An object of my invention is to provide for causing a dynamo-electric machine to generate a substantially constant voltage throughout a comparatively wide working range notwithstanding the fact that variations occur in the field excitation thereof.

A further object of my invention is to provide for establishing a substantially constant amount of field flux in a dynamo-electric machine, even though variations occur in the field excitation thereof.

A more specified object of my invention is to provide for so combining and so energizing a plurality of magnetic circuits of an electrical operating device that the resultant flux thereof is substantially constant over a comparatively wide working range, even though variations occur in the energization thereof.

A further object of my invention is to provide for producing a substantially constant resultant flux in a plurality of magnetic circuits of an electrical operating device by the combination of opposing fluxes.

Another object of my invention is to provide for so regulating the voltage impressed upon a motor that the speed thereof is maintained substantially constant for all load conditions.

Other objects and a fuller understanding of my invention may be had by referring to the following description, taken in connection with the accompanying drawing, which illustrates the preferred embodiment of my invention, and in which:

Figure 1 is a diagrammatic view of a control system embodying the features of my invention, Fig. 2 is a diagrammatic view of a dynamo-electric machine constructed in accordance with my invention and utilized in the control system in Fig. 1, Fig. 3 is a chart illustrating three curves which represent the magnetic characteristics of a dynamo-electric machine constructed in accordance with my invention, and Fig. 4 shows a modified form of my invention; wherein two dynamo-electric machines, when combined, have a voltage characteristic substantially the same as the voltage characteristic of the dynamo-electric machine shown in Fig. 2.

Referring more particularly to Fig. 1, the illustrated control system comprises, in general, a motor 10 for driving a load, represented generally by the reference character 11, a generator 19 having its armature connected in closed circuit with the armature of the motor 10, a dynamo-electric machine 35 constructed in accordance with my invention and driven by the motor 10, an exciter 22, a motor 14 for driving the generator 19 and the exciter 22, and an electro-responsive rheostat 71 for regulating the excitation of the field winding 21 of the generator 19.

The alternating-current driving motor 14, which is connected to a supply source represented by the conductors 16, 17 and 18, as well as the direct-current motor 10, the direct-current generator 19, and the exciter 22 may be machines of any well known types. Preferably, as shown, the exciter 22 is self-excited and is disposed to provide excitation for the field winding 12 of the motor 10, the field winding 21 of the generator 19, and the field windings 39, 40, 43 and 44 of the dynamo-electric machine 35.

Inasmuch as I have preferably shown the armature of the motor 10 connected in closed circuit relation with the armature of the generator 19, the speed of the motor 10 may be regulated by varying the excitation of the field winding 21 of the generator 19. Furthermore, by this arrangement, the speed of the motor 10 may be maintained substantially constant, regardless of sudden changes in the load condition, by inversely and proportionally varying the voltage impressed upon the motor 10 as the speed thereof tends to change.

For the purpose of inversely and proportionally varying the voltage impressed on the motor 10 as the speed thereof tends to change, I provide a dynamo-electric machine 35 that is connected in circuit relation with an electro-responsive rheostat 71, which controls the excitation of the field winding 21 of the generator 19.

The electro-responsive rheostat 71 may be of any well-known type, and, in this instance, I have preferably shown a carbon-pile rheostat that is operated by an electro-magnet 78. As illustrated, the pressure upon the plurality of carbon plates 72 that are disposed between the spaced terminals 75 and 76 may be varied by means of the L-shaped arm 74 that is pivotally connected to the stationary member 73. The spring 77 is disposed to bias the upright portion of the arm 74 against the terminal 75. By this arrangement the pressure to which the carbon plates are subjected, thus varying the resistance thereof, is dependent upon the combined effect of the upwardly-acting attractive force of the armature 79 and the opposing biasing force of the spring 77. For the purpose of preventing hunting of the armature 79, thus slightly varying the resistance of the carbon-pile rheostat, a dashpot 80 is connected to the upper end of the armature 79 by means of the illustrated spring.

Referring more specifically to Fig. 2, the dynamo-electric machine 35 comprises a pair of poles 37 and 38 having a restricted area at 45 and 46, respectively, and a pair of poles 41 and 42, generally considered as of the conventional type. Preferably, as illustrated, the poles are disposed 90 electrical degrees apart and are so arranged that the pair of adjacent poles 37 and 38, together with the associated armature 47 and the yoke portion 48, constitute one magnetic circuit and that the pair of adjacent poles 41 and 42, together with the associated armature 47 and the yoke portion 49, constitute a second magnetic circuit. The path of the flux that traverses the first-mentioned magnetic circuit is indicated generally by the dotted line 50 and the path of the flux that traverses the second-mentioned magnetic circuit is indicated generally by the dotted line 51.

As is apparent, by this arrangement of the poles, which is a departure from the arrangement of the poles in a conventional dynamo-electric machine, two substantially independent magnetic circuits are provided. That is to say, when the armature is provided with a wave winding, the voltage generated by the flux that traverses the pair of poles 37 and 38 opposes the voltage generated by the flux that traverses the pair of poles 41 and 42.

For the purpose of making the magnetic characteristics of the two pairs of poles different, portions of the opposite sides of the pair of poles 37 and 38 are cut away to provide restricted areas at 45 and 46. However, it is to be understood that the magnetic characteristics of the pair of poles 37 and 38 may be changed by providing saturated portions in any part of the magnetic circuit. Because of the restricted areas, the pair of poles 37 and 38 are worked at relatively higher saturation than the pair of poles 41 and 42. The magnetization of the pair of poles 37 and 38 is represented generally by the curve 37—38 and the magnetization of the pair of poles 41 and 42 by the curve 41—42, (see Fig. 3).

In order that the value of the flux traversing the pair of poles 37 and 38 may be larger than the value of the flux traversing the pair of poles 41 and 42, I provide for exciting the pair of poles 37 and 38 with considerably more ampere-turns than the pair of poles 41 and 42. To this end, I provide for limiting or adjusting the current that traverses the windings 43 and 44 by means of a resistor 52, that has a plurality of taps.

The curve 161, which represents the resultant flux, is obtained by subtracting the corresponding values or ordinates of the curve 41—42 from those of the curve 37—38. As will be noted, because of the different magnetic characteristics of the two pairs of poles, the difference between the curve 37—38 and the curve 41—42 from point 163 to point 165 is substantially the same over this wide range of excitation. For this reason, the variations over this range of the resultant flux, which is represented by the curve 161, are relatively small as compared to the variations in the field excitation.

In order to provide the maximum working range of the field excitation with the least variations in the resultant flux, I provide for so adjusting the value of the current that traverses the windings 43 and 44 of the poles 41 and 42 that the maximum value of the resultant flux occurs substantially midway between the practical limits of the maximum working range of the field excitation. In other words, with reference to the curves, the point 164, which represents the maximum value of the resultant flux, should be so adjusted by varying the excitation of the windings 43 and 44 that the slope of the resultant flux curve 161, on each side of the point 164, should be substantially the same. This adjustment is made during the testing of the dynamo-electric machine by observing and plotting the readings of a voltmeter that is connected across the armature thereof as the resistance taps of the resistor 52 are varied. The setting of the resistor 52 is determined when the voltage curve plotted from the voltmeter readings, has substantially the same flat or nondrooping characteristic on the approaching side of the maximum voltage reading as it has on the receding side of the maximum voltage reading. The setting of the resistor when once determined is permanently fixed.

In explaining the operation of the dynamo-electric machine 35 in connection with the control system of Fig. 1, let it be assumed that the direct-current generator 19 is delivering current to the motor 10 and that the exciter 22 is supplying current to the conductors 26 and 27, which, in turn, deliver current to the field windings of the motor 10, of the generator 19 and of the dynamo-electric machine 35. The circuit for exciting the field winding 12 extends from the positive conductor 26 through conductor 96, the field winding 12, an adjustable resistor 13 and conductor 97 to the negative conductor 27.

The circuit for energizing the windings 40 and 39 of the dynamo-electric machine 35 extends from the positive supply conductor 26 through conductors 54 and 57, the winding 40, conductor 56, the winding 39 and conductors 55 and 53 to the negative supply conductor 27. The circuit for energizing the windings 44 and 43 of the dynamo-electric machine 35 extends from the positively energized conductor 54 through conductor 60, the rheostat 52, conductor 59, the winding 44, conductor 58, the winding 43 and conductor 63 to the negatively energized conductor 53. The field winding 21 of the generator 19 is energized by the supply conductors 26 and 27 through a circuit that may be traced from the positive supply conductor 26 through conductor 98, the field winding 21, conductor 99, adjustable rheostat 81, conductor 100, the carbon-pile rheostat 72 and conductor 101 to the negative supply conductor 27.

For the purpose of inversely and proportionally varying the excitation of the field winding 21 in accordance with the speed of the motor 10, the winding of the electro-magnet 78 that controls the carbon-pile rheostat 71, is connected in closed circuit relation with the armature of the dynamo-electric machine 35. The closed circuit may be traced from one terminal of the dynamo-electric machine through conductor 64, the winding of the electro-magnet 78, conductor 102, an adjustable resistor 82 and conductors 103 and 65 to the other terminal of the dynamo-electric machine.

In this manner, by means of the combined action of the upwardly acting attractive force of the armature 79 and the opposing biasing force of the spring 77, the resistance of the carbon-pile rheostat 71 varies directly in accordance with the speed of the motor 10. Suppose for illustration that the speed of the motor 10 tends to decrease, as a result of an additional load. Under this assumption, the generated voltage of dynamo-electric machine 35 would correspondingly decrease and thus weaken the magnetization of the relay 78. A decrase in the magnetization of the relay 78 allows the spring 77 to compress the plurality of carbon plates 72 of the carbon-pile rheostat 71 to a greater pressure, thus reducing the resistance thereof. This decrease in resistance, in turn, allows the exciting current of the field winding 21 to increase, with the result that the generator 19 delivers a higher voltage, thereby reestablishing the normal motor speed.

Suppose the speed of the motor 10 tends to increase, as a result of a decrease in the load. Under this assumption, the operation of the control system would be the reverse of that just described, as will be understood.

I find that the dynamo-electric machine 35, by reason of the fact that the voltage generated thereby is directly responsive to the speed of the motor 10, even though the field excitation thereof may vary considerably, causes the voltage that is generated by the generator 19 to vary inversely and proportionally as the speed of the motor 10 tends to change from a predetermined value. In the control system in Fig. 1, even though the excitation of the windings of the dynamo-electric machine 35 varies, as a result of the change in resistance, caused by different operating temperatures, the voltage generated by the dynamo-electric machine is still responsive to the speed of the motor 10. The same is true if the voltage of the exciter 22 changes to vary the excitation of the dynamo-electric machine.

For the purpose of providing a relatively broad speed range for the motor 10, I provide two variable resistors 81 and 82, preferably actuated by a common shaft 84, having an operating knob 83.

By this arrangement, the effect of the two variable resistors 81 and 82 is cumulative. That is to say, by turning the knob 83 in a clockwise direction, the value of resistance 82 increases to weaken the energization of the relay 78 which, in turn, causes the resistance of the carbon-pile rheostat 71 to decrease, and at the same time, the rotation causes the value of resistor 81 to decrease. However, the speed range may be further broadened by adjusting the adjustable rheostat 13 that is connected in series with the winding 12 of the motor 10.

The dynamo-electric machine 35, inasmuch as it generates a voltage directly responsive to the speed at which it is being driven, even though the field excitation thereof may change, provides, in combination with a voltmeter 105, a means for measuring the speed of the motor 10. The voltmeter 105 is calibrated to read speed in R. P. M. and is connected across the armature of the dynamo-electric machine by means of the conductors 104 and 106.

In Fig. 4, I have shown a modification of my invention embodying two dynamo-electric machines which, when combined, have the same voltage characteristic as the dynamo-electric machine of Fig. 2. The poles 137 and 138 and the windings therefor of the machine 110 are of the same design and have the same characteristics as the poles 37 and 38 and the windings therefor of the machine of Fig. 2. Also the poles 141 and 142 and the windings therefor of the machine 111, have the same characteristics as the poles 41 and 42 and the windings therefor of the machine of Fig. 2. As illustrated, the armatures of the two machines are so connected that the voltage generated by the machine 110 opposes, and exceeds the value of, the voltage generated by the machine 111. In consequence, the resultant voltage is substantially the same as the voltage generated by the machine of Fig. 2.

Since certain changes in my invention may be made without departing from the spirit and scope thereof, it is intended that all matters contained in the foregoing description and shown in the accompanying drawing shall be interpreted as illustrative and not in a limiting sense.

I claim as my invention:

1. In combination, a dynamo-electric machine having a magnetic circuit, a second magnetic circuit associated therewith, means for magnetizing the first-mentioned magnetic circuit at a higher saturation than the second-mentioned magnetic circuit, and means for so energizing the magnetic circuits as to cause the flux that is produced in the first-mentioned magnetic circuit to oppose, and to exceed the value of, the flux that is produced in the second-mentioned magnetic circuit, a motor for driving said machine, and means responsive only to speed changes of said machine and motor for compensatingly varying the applied voltage and speed of said motor.

2. In combination, a dynamo-electric machine having a magnetic circuit, a second magnetic circuit associated therewith, means for so magnetizing the magnetic circuits as to cause the flux of the first-mentioned magnetic circuit to oppose, and to so exceed the value of, the flux of the second-mentioned magnetic circuit that the difference between their flux values is substantially constant throughout a relatively wide working range, a motor driving said machine, a generator for applying voltage to said motor, and means responsive only to speed changes of said machine for compensatingly varying the excitation of said generator to correct such speed changes.

3. In combination, a dynamo-electric machine having a plurality of magnetic circuits for producing a resultant flux, means for so energizing the magnetic circuits as to cause the resultant flux to be the difference between opposing fluxes, and means for causing the difference between the value of the opposing fluxes to be substantially constant throughout a relatively wide working range, a motor for driving said machine, a generator for applying voltage to said motor, and regulating means responsive only to speed changes of said machine for compensatingly varying the resistance of the field winding circuit of said generator to correct such speed changes.

4. A dynamo-electric machine having a pair of poles having a restricted area, a second pair of poles associated therewith, all of said poles being successively disposed substantially 90 electrical degrees apart and the pair of poles having a restricted area being disposed adjacent to each other, means for so magnetizing the pair of poles having a restricted area as to work them at a relatively high degree of saturation, means for so energizing the second-mentioned pair of poles as to work them at a relatively low degree of saturation, and means for causing the flux of the pair of poles having a restricted area to oppose, and to so exceed the value of, the flux of the second-mentioned pair of poles that the difference between the said opposing fluxes is substantially a constant value for a relatively wide working range, a motor for driving said machine, and means responsive only to speed changes of said machine and motor for compensatingly varying the applied voltage and speed of said motor.

5. A dynamo-electric machine having a plurality of poles having different characteristics for producing a resultant flux, windings for said poles, a second winding influenced by said flux, means for causing a voltage to be generated in said second-mentioned winding, and means for so energizing the windings of said poles as to cause the value of the generated voltage to be substantially constant throughout a relatively wide range of energization for a given speed, a motor driving said machine, a generator for applying voltage to said motor, and means responsive only to speed changes of said machine for compensatingly varying the excitation of said generator to correct such speed changes.

6. In a control system, in combination, a driving motor, means for delivering a voltage to said motor, a dynamo-electric machine having a plurality of field windings, driven by said motor, means associated with the dynamo-electric machine and responsive only to speed changes thereof for varying the value of the voltage delivered to said motor, means for energizing the windings of the dynamo-electric machine, and means for causing the value of the voltage delivered to the driving motor to remain substantially constant when variations occur in the energization of the field windings of the dynamo-electric machine.

7. A dynamo-electric machine having a plurality of magnetic circuits having different characteristics for producing fluxes, a winding influenced by said fluxes, means for causing a voltage to be generated in said winding, and means for so energizing the magnetic circuits as to cause the value of the generated voltage to be substantially constant throughout a relatively wide range of energization for a given speed, a motor for driving said machine, a generator for applying voltage to said motor, and regulating means responsive only to speed changes of said machine for compensatingly varying the resistance of the field winding circuit of said generator to correct such speed changes.

8. In a control system, in combination, a driving motor, means for regulating the speed of said motor, a dynamo-electric machine driven by said motor, said machine having a plurality of field windings, means associated with the dynamo-electric machine and responsive only to speed changes thereof for controlling the motor regulating means, means for energizing the windings of the dynamo-electric machine, and means for causing the motor regulating means to maintain the speed of the motor substantially constant when variations occur in the energization of the field windings of the dynamo-electric machine.

9. In combination, a dynamo-electric machine having a magnetic circuit, a second dynamo-electric machine having a magnetic circuit, means for causing the magnetic characteristics of the first-mentioned machine to be different from the magnetic characteristics of the second-mentioned machine, a winding for each machine, means for generating a voltage in the winding of each machine, means for so connecting the said windings in circuit relation, as to cause the voltage generated therein to oppose each other, and means for so energizing the said magnetic circuits as to cause the value of the voltage generated in one of the said windings to so exceed the value of the voltage generated in the other of said windings that the resultant voltage is substantially constant throughout a relatively wide range of energization for a given speed, and means responsive only to speed changes of said machines for producing a variable current effective to correct such speed changes.

10. In combination, a dynamo-electric machine, having a magnetic circuit, a second dynamo-electric machine having a magnetic circuit, means for causing the magnetic characteristics of the first-mentioned machine to be different from the magnetic characteristics of the second-mentioned machine, an armature winding for each machine, means for so connecting the said armature windings in circuit relation as to cause the voltage generated therein to oppose each other for producing a resultant voltage, and means for so energizing the said magnetic circuits as to cause the resultant generated voltage to be substantially constant throughout a relatively wide range of energization for a given speed, and means responsive only to speed changes of said machines for producing a variable current effective to correct such speed changes.

11. In combination, dynamo-electric means embodying a magnetic circuit, a second magnetic circuit associated therewith, means for causing the magnetic circuits to have different characteristics, and means for so energizing the magnetic circuits as to cause the voltage that is produced by the first-mentioned magnetic circuit to oppose and to exceed the value of the voltage that is produced by the second-mentioned magnetic circuit, an electric circuit the current of which is to be controlled and means distinct from said dynamo-electric means and responsive only to speed changes thereof for controlling the current in said circuit.

12. In combination, dynamo-electric means embodying a magnetic circuit, a second magnetic circuit associated therewith, means for causing the first-mentioned magnetic circuit to have a higher reluctance than the second-mentioned magnetic circuit, and means for so energizing the magnetic circuits as to cause the voltage that is produced in the first-mentioned magnetic circuit to oppose and to exceed the value of the voltage that is produced in the second-mentioned magnetic circuit, an electric circuit and regulating means responsive only to speed changes of said dynamo-electric means for controlling the current in said circuit.

13. In combination, dynamo-electric means embodying a plurality of magnetic circuits for producing a resultant voltage, means for so energizing the magnetic circuits as to cause the resultant voltage to be the difference between opposing voltages, and means for causing the difference between the value of the opposing voltages to be substantially constant through a relatively wide working range for a given speed, a motor for driving said dynamo-electric means, a generator for applying voltage to said motor and regulating means responsive only to speed changes of said dynamo-electric means for compensatingly varying the resistance of the field winding circuit of said generator to correct such speed changes.

14. In combination, a dynamo-electric machine having a plurality of magnetic circuits for producing a resultant flux, means for so energizing the magnetic circuits as to cause the resultant flux to be the difference between opposing fluxes, a closed electric circuit the current characteristics of which are to be controlled, means for causing the magnetic circuits to have different characteristics so that a certain electrical characteristic of said dynamo-electric machine varies with changes of the speed of said machine, and means responsive to said certain electrical characteristics of said machine for controlling the current characteristics of said electric circuit.

15. In combination, a dynamo-electric machine having a magnetic circuit, a second magnetic circuit, associated therewith, means for causing the magnetic circuits to have different characteristics, means for so energizing the magnetic circuits as to cause the flux that is produced by the first-mentioned magnetic circuit to oppose, and to exceed, the value of the flux that is produced by the second-mentioned magnetic circuit, whereby a certain electrical characteristic of said machine varies only with changes of speed of said machine regardless of any variations of the effect of said means for energizing the magnetic circuits, a closed electric circuit the current value of which is to be controlled, and means responsive to said certain electrical characteristic of said machine to control the current value in said circuit.

16. In combination, a dynamo-electric machine having armature windings, a magnetic circuit, a second magnetic circuit associated therewith, means for causing the first-mentioned magnetic circuit to have a higher reluctance than the second-mentioned magnetic circuit and means for so energizing the magnetic circuits as to cause the flux that is produced in the first-mentioned magnetic circuit to oppose, and to exceed the value of the flux that is produced in the second-mentioned magnetic circuit, whereby the voltage induced in said armature windings is proportional only to the speed of said windings and is independent of the magnetic energization of either magnetic circuit, an electric circuit, and regulating means responsive to the voltage changes of said machine to control the current flowing in said electric circuit.

17. A dynamo-electric machine having an armature winding, a pair of poles and a second pair of poles associated therewith, and means for magnetizing the said pairs of poles as to cause the flux of the first-mentioned pair of poles to oppose, and to so exceed the value of the flux of the second-mentioned pair of poles that the difference between their flux values is substantially constant throughout a relatively wide working range whereby the voltage of said armature windings varies with changes of the speed of the windings and does not change with changes of the respective magnetizations of said respective pairs of poles.

18. A dynamo-electric machine having armature windings, a pair of poles having a restricted sectional area, a second pair of poles associated therewith, and means for so magnetizing the said pairs of poles as to cause the flux of the first-mentioned pair of poles to oppose, and to exceed the value of the flux of the second-mentioned pair of poles, whereby the voltage of said windings is not, for the working range, affected by the magnetization of said poles but is a function of only the speed of the windings.

19. In combination, dynamo-electric means including a plurality of magnetic circuits having different magnetic characteristics to produce in said dynamo-electric means a resultant constant voltage for a given speed, means for so energizing the magnetic circuits as to cause the resultant voltage to be the difference between opposing voltages whereby the resultant voltage remains constant for a given speed regardless of variations of the energization of the respective magnetic circuits.

PAUL E. HOCHSTETTER.